(12) United States Patent
Miyake et al.

(10) Patent No.: US 10,357,979 B2
(45) Date of Patent: Jul. 23, 2019

(54) INK COMPOSITION AND RECORDING METHOD

(71) Applicant: Seiko Epson Corporation, Tokyo (JP)

(72) Inventors: Yuho Miyake, Shiojiri (JP); Shintaro Hama, Shiojiri (JP); Ryosuke Teramoto, Matsumoto (JP); Tetsuya Aoyama, Shiojiri (JP)

(73) Assignee: Seiko Epson Corporation (JP)

( * ) Notice: Subject to any disclaimer, the term of this patent is extended or adjusted under 35 U.S.C. 154(b) by 98 days.

(21) Appl. No.: 15/581,363

(22) Filed: Apr. 28, 2017

(65) Prior Publication Data
US 2017/0355869 A1  Dec. 14, 2017

(30) Foreign Application Priority Data
Jun. 14, 2016 (JP) .................. 2016-118214

(51) Int. Cl.
*B41J 2/01* (2006.01)
*B41J 2/21* (2006.01)
*C09D 11/38* (2014.01)

(52) U.S. Cl.
CPC .............. *B41J 2/2107* (2013.01); *B41J 2/01* (2013.01); *C09D 11/38* (2013.01)

(58) Field of Classification Search
CPC .......... B41J 2/01; B41J 2/04588; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04595; B41J 2/04586; B41J 2/14274; B41J 11/0015; B41J 11/002; C09D 11/36; C09D 11/40; C09D 11/30; C09D 11/38; C09D 11/32; C09D 11/322; C09D 11/324; C09D 11/101; C09D 11/102; C09D 11/005; C09D 11/54; C09D 11/52; C09D 11/328; B41M 5/0011; B41M 5/0017; B41M 5/0047; B41M 7/00; B41M 7/0072; B41M 5/52; B41M 5/5218
See application file for complete search history.

(56) References Cited

U.S. PATENT DOCUMENTS

| | | | |
|---|---|---|---|
| 9,023,140 B2 | 5/2015 | Iseki et al. | |
| 9,193,882 B2 | 11/2015 | Aruga et al. | |
| 9,334,389 B2 | 5/2016 | Ozawa | |
| 2014/0150690 A1* | 6/2014 | Mizusaki ............ | C09D 171/02 106/31.13 |
| 2014/0218451 A1 | 8/2014 | Iseki et al. | |
| 2015/0065631 A1 | 3/2015 | Ozawa | |
| 2015/0085034 A1 | 3/2015 | Aruga et al. | |
| 2016/0032125 A1 | 2/2016 | Ohori et al. | |

FOREIGN PATENT DOCUMENTS

| | | |
|---|---|---|
| JP | 2013-224371 A | 10/2013 |
| JP | 2014-152182 A | 8/2014 |
| JP | 2015-044954 A | 3/2015 |
| JP | 2015-151482 A | 8/2015 |
| JP | 2016-029148 A | 3/2016 |

* cited by examiner

*Primary Examiner* — Manish S Shah
(74) *Attorney, Agent, or Firm* — Harness, Dickey & Pierce, P.L.C.

(57) ABSTRACT

An ink composition at least contains a compound A having a hydroxy group and a compound B having an aldehyde group as polyoxyalkylene alkyl ether surfactants. The mass ratio of the compound B to the compound A is $0.5 \times 10^{-4}$ to $30 \times 10^{-4}$.

5 Claims, 2 Drawing Sheets

INK COMPOSITION AND RECORDING METHOD

BACKGROUND

1. Technical Field

The present invention relates to an ink composition and a recording method.

2. Related Art

Ink jet recording methods can record highly fine images with relatively simple apparatuses and have been rapidly developed in various fields. Among them, various studies have been made on, for example, characteristics of ink compositions. For example, JP-A-2015-44954 discloses an ink for ink jet recording containing a polyhydric alcohol monoethyl ether or a polyhydric alcohol monopropyl ether and a polyhydric alcohol monobutyl ether for preventing both mist pollution and offset.

In JP-A-2015-44954, removal of mist is evaluated in Example, but prevention of occurrence of mist is not evaluated at all. Ink compositions contain surfactants from the viewpoint of, for example, initial filling performance (wettability) and solubility for foreign matter, which may occur in inks. However, mere use of a surfactant rather facilitates occurrence of mist in some cases.

SUMMARY

An advantage of some aspects of the invention is to provide an ink composition barely generating mist and having excellent ink storage stability, foreign matter solubility, and initial filling performance and to provide a recording method.

The present inventors have diligently studied to solve the above-described problems and, as a result, have found that the problems can be solved by using a specific polyoxyalkylene alkyl ether surfactant, and have accomplished the present invention.

That is, the ink composition of the present invention at least contains a compound A and a compound B as polyoxyalkylene alkyl ether surfactants, wherein the compound A has a hydroxy group and is represented by Formula (1), and the compound B has an aldehyde group and is represented by Formula (2):

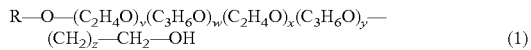

(1)

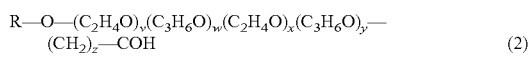

(2)

in Formulae (1) and (2), each R independently represents an alkyl group having 1 to 20 carbon atoms, each v independently represents 1 to 20, each w independently represents 0 to 20, each x independently represents 0 to 20, each y independently represents 0 to 20, and each z independently represents 1 to 2; and a relationship of $5 \leq v+w+x+y+z \leq 30$ is satisfied; and the mass ratio of the compound B to the compound A is $0.5 \times 10^{-4}$ to $30 \times 10^{-4}$.

In a preferred aspect of the present invention, the content of compound B is 1 to 100 ppm based on the total amount of the ink composition; the content of the polyoxyalkylene alkyl ether surfactants is 0.2 to 5.0 mass % based on the total amount of the ink composition; and the ink composition further contains water, a penetration solvent, and a coloring material.

The recording method of the present invention includes a step of discharging the ink composition by an ink jet system to allow the ink composition to adhere to a recording medium.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
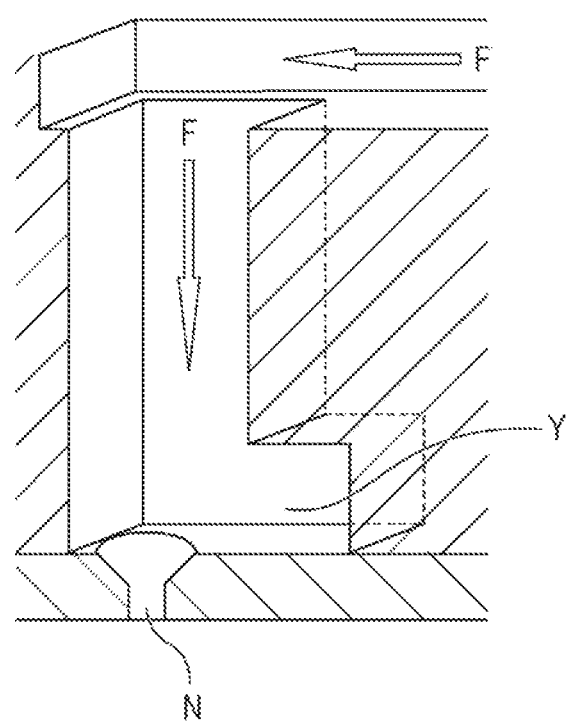
FIG. 1 is a schematic diagram illustrating a head structure including a stagnation point.

Aspects (hereinafter, referred to as "the embodiment") for implementing the present invention will now be described in detail with reference to the drawings as needed. The present invention is not limited to the following embodiments and can be implemented by being variously modified within the scope of the gist. In the drawings, the same elements are denoted by the same reference signs, and the duplicated explanation is omitted. The positional relation such as up and down and right and left is based on the positional relation shown in the drawing, unless otherwise specified. The dimensional ratios are not limited to those shown in the drawings.

Ink Composition

The ink composition of the embodiment at least contains a compound A and a compound B as polyoxyalkylene alkyl ether surfactants, wherein the compound A has a hydroxy group and is represented by Formula (1), and the compound B has an aldehyde group and is represented by Formula (2):

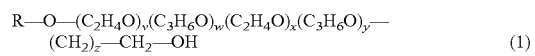

(1)

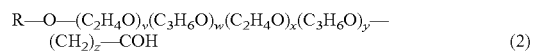

(2)

in Formulae (1) and (2), each R independently represents an alkyl group having 1 to 20 carbon atoms, each v independently represents 1 to 20, each w independently represents 0 to 20, each x independently represents 0 to 20, each y independently represents 0 to 20, and each z independently represents 1 to 2; and a relationship of $5 \leq v+w+x+y+z \leq 30$ is satisfied; and the mass ratio of the compound B to the compound A is $0.5 \times 10^{-4}$ to $30 \times 10^{-4}$.

If a component of a recording apparatus, for example, a cartridge or a tube, includes a releasing agent or a plasticizer as its constituent material, the releasing agent or the plasticizer is eluted into an ink composition and forms a metal salt (for example, a stearate) with a specific metal element in the ink composition in some cases. The metal salt is presumed to be one of factors causing precipitation of foreign matter in the ink composition. The ink composition of the present invention contains specific polyoxyalkylene alkyl ether surfactants and thereby increases the solubility for foreign matter to prevent the foreign matter from precipitating and solidifying. In particular, even if a general-purpose material containing a large amount of impurities is used as a material of the cartridge or the tube, the ink composition containing the specific polyoxyalkylene alkyl ether surfactants dissolves the impurities, such as a plasticizer, contained in such a material and can prevent the impurities from being heterogenized.

An increase in the capacity of an ink container, such as an ink cartridge, increases the chance of contact between the constituent material and the ink, resulting in an increase in the risk of heterogenization.

If the wettability of an ink composition to, for example, an ink flow path such as a head flow path is low, the ink does not spread in the ink flow path in the initial filling and bubbles are prone to remain. In particular, in a head having a complicate structure including a stagnation point Y such as that shown in FIG. 1, since the ink flow F is slow or absent, bubbles are prone to remain at the stagnation point. Herein, the term "stagnation point" refers to a place at which the ink flow rate is slow or absent, compared to the ink flow rate in the ink flow path such as a head flow path, and the stagnation point Y shown in FIG. 1 is an example thereof. The position of the stagnation point Y is not limited to the position shown in FIG. 1. The stagnation point may be present near a nozzle hole as shown in FIG. 1 or may be present near a driving portion such as a piezoelectric element (for example, within a range of 1 mm from the driving portion). If a stagnation point is present near a driving portion such as a piezoelectric element, bubbles act like a cushion and thereby the pressure is barely applied to the ink composition, leading to a risk of poor discharge (poor initial filling). In addition, the bubbles generated in an ink flow path move to a nozzle N with the course of a printing operation, resulting in a risk of causing poor discharge (poor initial filling). Therefore, higher wettability (smaller ink contact angle) of an ink composition to ink flow paths and other components is preferred. The ink composition of the present invention contains specific polyoxyalkylene alkyl ether surfactants. Consequently, the wettability of the ink composition to ink flow paths and other components is increased, and poor initial filling of the ink composition can be further prevented. In particular, the ink composition containing specific polyoxyalkylene alkyl ether surfactants can exhibit satisfactory ink filling performance even in a compact head (having narrow flow paths).

Furthermore, ink droplets discharged from nozzles of an ink jet head can be made into various shapes depending on the discharge conditions and the surface tension, the viscosity, and other factors of the ink composition. For example, droplets in spherical form, droplets including small spheres called satellite, or droplets with long tails in the discharge direction are formed. Among these droplets, if the ink droplets discharged from nozzles have tails or generate satellites, the ink composition is misted inside the recording apparatus. Ink mist causes pollution of the apparatus, deterioration in image quality, poor discharge due to the mist adhered to nozzle surfaces, and encoder reading failure. Accordingly, from the viewpoint of preventing misting of the ink inside a recording apparatus, spherical ink droplets are preferred. If an ink composition contains a polyoxyalkylene alkyl ether surfactant, ink droplets are prone to become elongated droplets having long tails in the discharge direction. Elongated droplets have a problem of being broken into fine ink droplets before reaching a recording medium and being prone to generate mist. Regarding this point, the present invention can control the flying shapes of the ink to a spherical form and prevent formation of mist by regulating the mass ratio of the compound B having an aldehyde group and represented by Formula (2) to the compound A having a hydroxy group and represented by Formula (1) within a predetermined range. In particular, even if the scattering range of an ink is reduced by miniaturization of the printer to enhance the harmful effects of ink mist, the ink composition of the present invention shows remarkable effects, i.e., excellent filling performance to small heads, high versatility to printer materials, and high reliability in compact apparatuses, in particular, in miniaturized and densified printers. In addition, the ink composition of the present invention does not generate mist not only in ink jet recording methods but also in recording by, for example, roller application or spray application and shows excellent effects of preventing, for example, pollution of the work environment due to atmospheric diffusion of the ink and pollution of the printing apparatuses and recording media.

Each component of the ink composition of the embodiment will now be described.

Polyoxyalkylene Alkyl Ether Surfactant

The ink composition of the embodiment contains a compound A and a compound B as polyoxyalkylene alkyl ether surfactants (hereinafter, also referred to as POAAEs). The compound A has a hydroxy group and is represented by Formula (1), and the compound B has an aldehyde group and is represented by Formula (2). The compound A having a hydroxy group can mainly act so as to reduce the dynamic surface tension, and the compound B having an aldehyde group can mainly act so as to improve the dynamic surface tension, but the actions are not limited thereto.

The mass ratio of the compound B to the compound A is $0.5 \times 10^{-4}$ to $30 \times 10^{-4}$, preferably $1 \times 10^{-4}$ to $20 \times 10^{-4}$, and more preferably $2 \times 10^{-4}$ to $15 \times 10^{-4}$. A mass ratio of the compound B to the compound A within this range further prevents occurrence of mist.

The content of the compound A in the polyoxyalkylene alkyl ether surfactants is 99.80 mass % or mass and 99.99 mass % or less. The content of the compound B in the polyoxyalkylene alkyl ether surfactants is 100 mass ppm or more and 2000 mass ppm or less.

The compound B can be prepared from the compound A, and the mass ratio of the compound B to the compound A can be adjusted by the conditions for the preparation. Specifically, the compound B having an aldehyde group can be prepared by aging (retaining) the compound A under warming to oxidize a part of the hydroxy groups of the compound A molecules to aldehyde groups. The aging for a longer time or at a higher temperature can increase the amount of compound B and, as a result, the mass ratio of the compound B to the compound A is increased.

The content of the polyoxyalkylene alkyl ether surfactants is preferably 0.2 to 5.0 mass % and more preferably 0.5 to 4.0 mass % based on the total amount of the ink composition. The polyoxyalkylene alkyl ether surfactants readily cause phase separation in the ink composition and tends to increase the viscosity with time. However, if the content of the polyoxyalkylene alkyl ether surfactants is within the above-mentioned range, the foreign matter solubility, the initial filling performance, and the ink storage stability are further improved, and occurrence of mist is further prevented.

Compound A

The compound A is a compound having a hydroxy group and represented by Formula (1):

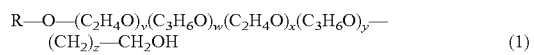

$$\text{R—O—}(C_2H_4O)_v(C_3H_6O)_w(C_2H_4O)_x(C_3H_6O)_y\text{—}(CH_2)_z\text{—}CH_2OH \qquad (1)$$

where R represents an alkyl group having 1 to 20 carbon atoms, v represents 1 to 20, w represents 0 to 20, x represents 0 to 20, y represents 0 to 20, and z represents 1 to 2; and a relationship of $5 \leq v+w+x+y+z \leq 30$ is satisfied.

The substituent R represents an alkyl group having 1 to 20 carbon atoms, preferably an alkyl group having 5 to carbon atoms. The subscript v represents 1 to 20, preferably 1 to 15, and more preferably 1 to 10. The subscript w represents 0 to 20, preferably 0 to 15, and more preferably 0 to 10. The subscript x represents 0 to 20, preferably 0 to 15, and more preferably 0 to 10. The subscript y represents 0 to 20, preferably 0 to 15, and more preferably 0 to 10. The subscript z represents 1 to 2. The sum, v+w+x+y+z, is 5 to 30, preferably 5 to 25, and more preferably 5 to 20.

Examples of the compound A are listed below, but are not limited to these examples:

$C_8H_{17}O(C_2H_4O)_vH$ (herein, v≥1),
$C_{12}H_{25}O(C_2H_4O)_6(C_3H_6O)_2(C_2H_4O)_6(C_3H_6O)_8H$,
$C_{13}H_{27}O(C_2H_4O)_6(C_3H_6O)_2(C_2H_4O)_6(C_3H_6O)_8H$,
$C_{12}H_{25}O(C_2H_4O)_6(C_3H_6O)_x(C_2H_4O)_y(C_3H_6O)_zH$ (herein, w+y=15 and x+z=4),
$C_{13}H_{27}O(C_2H_4O)_w(C_3H_6O)_x(C_2H_4O)_y(C_3H_6O)_zH$ (herein, w+y=15 and x+z=4)
$C_{12}H_{25}O(C_2H_4O)_8(C_3H_6O)_2(C_2H_4O)_6H$,
$C_{13}H_{27}O(C_2H_4O)_8(C_3H_6O)_2(C_2H_4O)_6H$,
$C_{12}H_{25}O(C_2H_4O)_{12}(C_3H_6O)_2(C_2H_4O)_{12}H$,
$C_{13}H_{27}O(C_2H_4O)_{12}(C_3H_6O)_2(C_2H_4O)_{12}H$,
$CH_3(CH_2)_9(CH_3)CHO(C_2H_4O)_7(C_3H_6O)_{4.5}H$,
$CH_3(CH_2)_{11}(CH_3) CHO(C_2H_4O)_7 (C_3H_6O)_{4.3}H$,
$CH_3(CH_2)_9(CH_3)CHO(C_2H_4O)_3 (C_3H_6O)_{3.5}H$,
$CH_3(CH_2)_{11} (CH_3) CHO(C_2H_4O)_3 (C_3H_6O)_{3.5}H$,
$C_{14}H_{29}O(C_2H_4O)_{14} (C_3H_6O)_2H$,
$C_{11}H_{23}O(C_2H_4O)_8H$,
$C_{10}H_{21}O(C_2H_4O)_{11}H$, and
$C_{12}H_{25}O(C_2H_4O)_{13}H$.

Any commercially available compound A can be used, and examples thereof include Newcol series 1004, 1006, 1008, and 1020 ($C_8H_{17}$—O—($CH_2CH_2O)_n$—H), 1203, 1204, and 1210 ($C_{18}H_{35}$—O—($CH_2CH_2O)_n$—H), 1305 and 1310 ($C_{13}H_{27}$—O—($CH_2CH_2O)_n$—H), 1525, 1533, 1545, and 1500-S (Castor oil-O—($CH_2CH_2O)_n$—H), 1606 and 1607 ($C_{16}H_{33}$—O—($CH_2CH_2O)_n$—H), 1807, 1820, and 1860 ($C_{18}H_{37}$—O—($CH_2CH_2O)_n$—H), 2502-A, 3504-C, and 3520-C(R—O—($CH_2CH_2O)_n$—H) (all manufactured by Nippon Nyukazai Co., Ltd.); Noigen DL-0415 ($R^6O$ ($C_2H_4O)_w(C_3H_6O)_x(C_2H_4O)_y(C_3H_6O)_zH$, "$R^6$": alkyl having 12 or 13 carbon atoms, w+y=15, x+z=4, HLB value: 15.0), Noigen ET-116B ($R^6O(C_2H_4O)_7 (C_3H_6O)_{4.5}H$, "$R^6$": alkyl having 12 or 14 carbon atoms, HLB value: 12.0), Noigen ET-106A ($R^6O(C_2H_4O)_5(C_3H_6O)_{3.5}H$, "$R^6$": alkyl having 12 or 14 carbon atoms, HLB value: 10.9), Noigen DH-0300 ($R^6O(C_2H_4O)_2H$, "$R^6$": alkyl having 14 carbon atoms, HLB value: 4.0), Noigen YX-400 ($R^6O(C_2H_4O)_{40}H$, "$R^6$": alkyl having 12 carbon atoms, HLB value: 18.1), and Noigen EA-160 ($C_9H_{19}C_6H_4O(C_2H_4O)_{16.8}H$, HLB value: 15.4) (all manufactured by DKS Co., Ltd.); and Emalgen 1108 (trade name, manufactured by Kao Corporation, $R^6O$ ($C_2H_4O)_8H$, "$R^6$": alkyl having 11 carbon atoms, HLB value: 13.4).

The content of the compound A is preferably 0.05 to 10.0 mass %, more preferably 0.2 to 5.0 mass %, and most preferably 0.5 to 4.0 mass % based on the total amount of the ink composition. If the content of the compound A is within this range, the foreign matter solubility, initial filling performance, and ink storage stability are further improved, and occurrence of mist is further prevented. The content of the compound A can be calculated by Expression (3):

Content of compound A after aging=[(molar amount of compound A before aging)−(molar amount of compound B after aging)]×(molecular weight of compound A)  (3).

When the polyoxyalkylene alkyl ether before aging contains 100 mass % of the compound A having a hydroxy group, the content of the compound A after aging can be calculated by subtracting the content of the resulting compound having an aldehyde group from the content of the compound A before the aging.

Compound B

The compound B is a compound having an aldehyde group and represented by Formula (2):

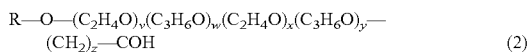

R—O—$(C_2H_4O)_v(C_3H_6O)_w(C_2H_4O)_x(C_3H_6O)_y$—$(CH_2)_z$—COH  (2)

where R represents an alkyl group having 1 to 20 carbon atoms, v represents 1 to 20, w represents 0 to 20, x represents 0 to 20, y represents 0 to 20, and z represents 1 to 2; and a relationship of 5≤v+w+x+y+z≤30 is satisfied.

The compound B may be any compound represented by Formula (2), and examples thereof include compounds exemplified as the compound A of which the OH group is oxidized to a COH group.

The content of the compound B is preferably 1 to 100 ppm, more preferably 10 to 100 ppm, and most preferably 30 to 70 ppm based on the total amount of the ink composition. If the content of the compound B is within this range, occurrence of mist is further prevented. Throughout the specification, ppm refers to mass ppm.

The content of the compound B can be determined by, but not limited to, an acetylacetone absorption spectrophotometry, a pack test MBTH method, an MBTH absorption spectrophotometry (also referred to as 3-methyl-2-benzothiazolinone hydrazone hydrochloride absorption spectrophotometry), an AHMT absorption spectrophotometry (also referred to as 4-amino-3-hydrazino-5-mercapt-1,2,4-triazole absorption spectrophotometry), or a method of public notice (gas chromatography-mass spectrometry: Notification of No. 261 of the Ministry of Health, Labor and Welfare, 2003, Annex Table 19). Preferred are the MBTH absorption spectrophotometry with a spectrophotometer and the method of public notice using GC/MS, which allow measurement with an accuracy of 1 ppm. For example, the MBTH method is specifically performed as follows: An excessive amount of MBTH is added to a sample to change aldehyde contained in the sample to azine, and a ferric chloride solution is then added to the sample to oxidize the MBTH to a reactive cation. The reactive cationic MBTH is allowed to react with the azine to obtain a blue reaction product. The absorbance of the sample is measured with a spectrophotometer. Separately, absorbances of standard solutions containing known masses of the compound B are measured under the same conditions as above, and a standard curve of the absorbance of the compound B is prepared. The content of the compound B in the sample is determined from the absorbance of the sample and the standard curve.

The compound B can be prepared from the compound A according to the preparation conditions. Specifically, the compound B having an aldehyde group can be prepared by aging (retaining) the compound A under warming to oxidize a part of the hydroxy groups of the compound A molecules to aldehyde groups. The aging for a longer time or at a higher temperature can increase the amount of the compound B and, as a result, the mass ratio of the compound B to the compound A is increased.

Water

The ink composition of the embodiment may optionally contain water.

The content of water is preferably 50 to 80 mass %, more preferably 55 to 75 mass %, and most preferably 60 to 75 mass % based on the total amount of the ink composition.

Penetration Solvent

The ink composition of the embodiment may optionally contain a penetration solvent. The penetration solvent may be any solvent, and examples of the penetration solvent include glycol ether compounds, such as ethylene glycol mono(di)methyl ether, ethylene glycol mono(di)ethyl ether, ethylene glycol mono(di)propyl ether, ethylene glycol mono(di)butyl ether, diethylene glycol mono(di)methyl ether, diethylene glycol mono(di)ethyl ether, diethylene glycol mono(di)propyl ether, diethylene glycol mono(di)butyl ether, triethylene glycol mono(di)methyl ether, triethylene glycol mono(di)ethyl ether, triethylene glycol mono(di)propyl ether, triethylene glycol mono(di)butyl ether, propylene glycol mono(di)methyl ether, propylene glycol mono(di)ethyl ether, propylene glycol mono(di)propyl ether, propylene glycol mono(di)butyl ether, dipropylene glycol mono(di)methyl ether, dipropylene glycol mono(di)ethyl ether, dipropylene glycol mono(di)propyl ether, dipropylene glycol mono(di)butyl ether, tripropylene glycol mono(di)methyl ether, tripropylene glycol mono(di)ethyl ether, tripropylene glycol mono(di)propyl ether, and tripropylene glycol mono(di)butyl ether; and alkyl polyol compounds, such as glycerin, 1,3-butanediol, 2-methyl-1,3-propanediol, 3-methyl-1,3-butanediol, 3-methyl-1,5-pentanediol, 1,5-pentanediol, 3-methyl-1,5-pentanediol, 1,2-hexanediol, 1,6-hexanediol, and 2-ethyl-1,3-hexanediol. The penetration solvents may be used alone or in combination of two or more thereof.

The content of the penetration solvent is preferably 5 to 25 mass %, more preferably 5 to 20 mass %, and most preferably 5 to 15 mass % based on the total amount of the ink composition. If the content of the penetration solvent is 5 mass % or more, the permeability to media is further improved, the drying property of printed matters is further improved, and also the solubility of the polyoxyalkylene alkyl ether surfactants in the ink is further improved. If the content of the penetration solvent is 25 mass % or less, poor discharge due to a reduction in the dynamic surface tension is further prevented.

Surfactant Other than Polyoxyalkylene Alkyl Ether Surfactant

The ink composition of the embodiment may optionally contain a surfactant other the polyoxyalkylene alkyl ether surfactants. Any surfactant can be used as the surfactant other than the polyoxyalkylene alkyl ether surfactants. For example, acetylene glycol surfactants, fluorine surfactants, and silicone surfactants can be used. Among these surfactants, preferred are acetylene glycol surfactants.

Any acetylene glycol surfactant can be used. For example, preferred are one or more selected from 2,4,7,9-tetramethyl-5-decin-4,7-diol, alkylene oxide adducts of 2,4,7,9-tetramethyl-5-decin-4,7-diol, 2,4-dimethyl-5-decin-4-ol, and alkylene oxide adducts of 2,4-dimethyl-5-decin-4-ol. Any commercially available acetylene glycol surfactant can be used. Examples of the commercially available acetylene glycol surfactant include Olfine 104 series and Olfine E series, such as Olfine E1010, (trade names of Nissin Chemical Industry CO., Ltd.); Olfine PD series, such as PD-001D and PD-002W (trade names of Nissin Chemical Industry CO., Ltd.); Olfine EXP series, such as EXP4001 and EXP4300 (trade names of Nissin Chemical Industry CO., Ltd.); and Surfynol series, such as Surfynol 465, Surfynol 61, and Surfynol DF-110D (trade names of Air Products Japan, Inc.). The acetylene glycol surfactants may be used alone or in combination of two or more thereof.

Any fluorine surfactant can be used. Examples of the fluorine surfactant include perfluoroalkyl sulfonates, perfluoroalkyl carboxylates, perfluoroalkyl phosphates, perfluoroalkyl ethylene oxide adducts, perfluoroalkyl betaines, and perfluoroalkyl amine oxide compounds. Any commercially available fluorine surfactant can be used, and examples thereof include S-144 and S-145 (manufactured by Asahi Glass Co., Ltd.); FC-170C, FC-430, and Fluorad-FC4430 (manufactured by 3M Japan Limited); FSO, FSO-100, FSN, FSN-100, and FS-300 (manufactured by E.I. du Pont de Nemours and Company); and FT-250 and 251 (manufactured by Neos Co., Ltd.). The fluorine surfactants may be used alone or in combination of two or more thereof.

Examples of the silicone surfactant include polysiloxane compounds and polyether-modified organosiloxane. Any commercially available silicone surfactant can be used, and examples thereof include BYK-306, BYK-307, BYK-333, BYK-341, BYK-345, BYK-346, BYK-347, BYK-348, and BYK-349 (all trade names, manufactured by BYK Japan KK.); and KF-96-2cs, KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all trade names, manufactured by Shin-Etsu Chemical Co., Ltd.).

The content of the surfactant other than the polyoxyalkylene alkyl ether surfactants is preferably 0.1 to 5.0 mass %, more preferably 0.5 to 2.5 mass %, and most preferably 0.1 to 2.0 mass % based on the total amount of the ink composition. A content of less than 0.1 mass % has a risk of poor initial filling due to a lack of ink wettability, and a content of higher than 2.0 mass % has a risk of dissolution failure of the polyoxyalkylene alkyl ether surfactants.

Coloring Material

The ink composition of the embodiment may optionally contain a coloring material. Any coloring material can be used, and examples thereof include dyes and pigments.

As the dye, any dye, for example, acidic dyes, direct dyes, reactive dyes, and basic dyes can be used. Examples of such dyes include C.I. Acid Yellows 17, 23, 42, 44, 79, and 142; C.I. Acid Reds 52, 80, 82, 249, 254, and 289; C.I. Acid Blues 9, 45, and 249; C.I. Acid Blacks 1, 2, 24, and 94; C.I. Food Blacks 1 and 2; C.I. Direct Yellows 1, 12, 24, 33, 50, 55, 58, 86, 132, 142, 144, and 173; C.I. Direct Reds 1, 4, 9, 80, 81, 225, and 227; C.I. Direct Blues 1, 2, 15, 71, 86, 87, 98, 165, 199, and 202; C.I. Direct Blacks 19, 38, 51, 71, 154, 168, 171, and 195; C.I. Reactive Reds 14, 32, 55, 79, and 249; and C.I. Reactive Blacks 3, 4, and 35. These dyes may be used alone or in combination of two or more thereof.

As the pigment, any pigment, for example, inorganic pigments and organic pigments can be used. Any inorganic pigment can be used, and examples thereof include carbon black (C.I. Pigment Black 7) and carbon blacks, such as furnace black, lamp black, acetylene black, and channel black; iron oxides; and titanium oxides. Any organic pigment can be used, and examples thereof include quinacridone pigments, quinacridonequinone pigments, dioxadine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments. The pigments may be used alone or in combination of two or more thereof.

The content of the coloring material is preferably 0.1 to 15.0 mass %, more preferably 1 to 12.5 mass %, and most preferably 2.0 to 8.0 mass % based on the total amount of the ink composition. A content of less than 0.1 mass % may deteriorate the color development of printed matters, and a content of higher than 15.0 mass % may cause poor discharge due to an increase in ink viscosity, dissolution failure of the coloring material, and insufficient recovery from head clogging.

pH Adjuster

The ink composition of the embodiment may contain a pH adjuster. The pH adjuster can readily adjust the pH value of an ink. Any pH adjuster can be used, and examples thereof include inorganic acids (for example, sulfuric acid, hydrochloric acid, and nitric acid), inorganic bases (for example, lithium hydroxide, sodium hydroxide, potassium hydroxide, and ammonia), organic bases (for example, triethanolamine, diethanolamine, monoethanolamine, and tripropanolamine), and organic acids (for example, adipic acid, citric acid, and succinic acid). The pH adjusters may be used alone or in combination of two or more thereof.

Other Components

The ink composition of the embodiment can also appropriately contain various additives, such as a dissolution aid, a viscosity modifier, a pH adjuster, an antioxidant, a preservative, an antifungal agent, a corrosion inhibitor, and a chelating agent for capturing metal ions that influence dispersion, for maintaining good storage stability and discharge stability from a head, for improving clogging, or for preventing deterioration of the ink.

Recording Method

Figure 2:
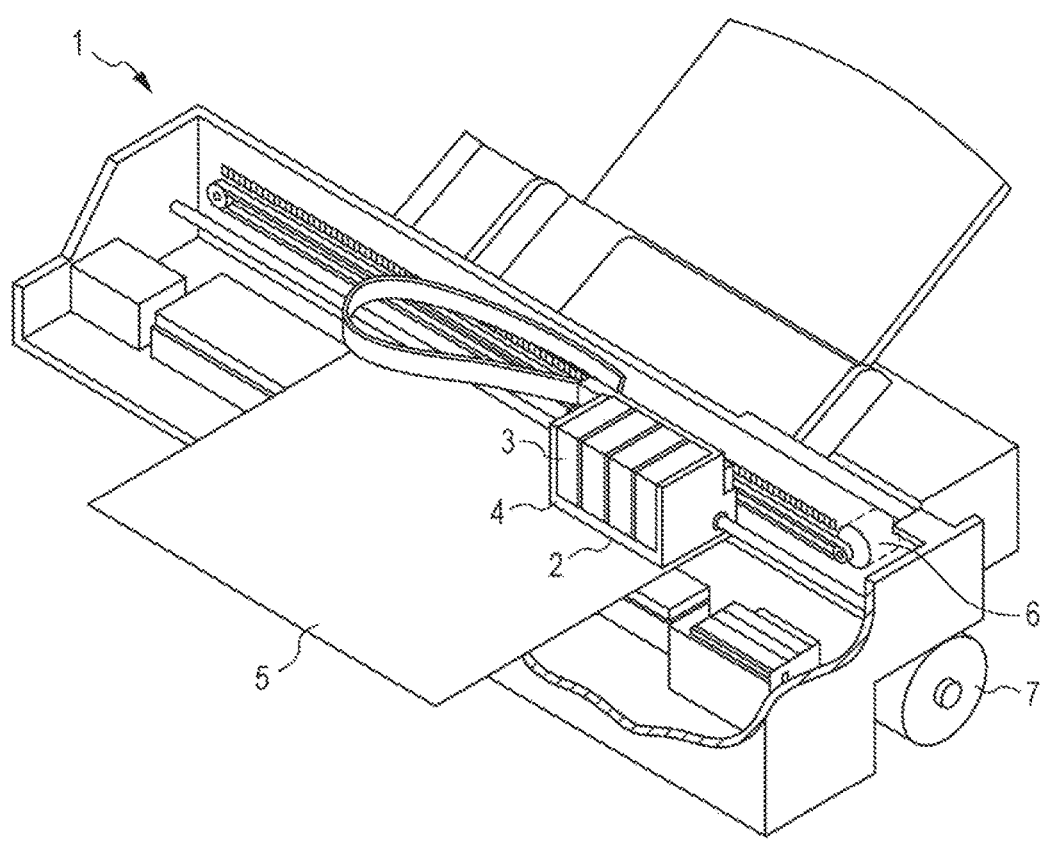
FIG. 2 is a diagram illustrating an example of a recording apparatus that can be used in an embodiment.

The recording method of the embodiment includes a step of discharging the ink composition with an ink jet system to allow the ink composition to adhere to a recording medium. As the recording apparatus, a known ink jet printer (recording apparatus) can be used. FIG. 2 shows an example of the recording apparatus for performing the recording method of the embodiment.

FIG. 2 is a perspective view illustrating the structure of a printer 1. As shown in FIG. 2, the printer 1 includes a carriage 4 mounting an ink jet recording head 2 and having a detachable ink cartridge 3, a carriage moving mechanism 6 for moving the carriage 4 in the medium width direction (main scanning direction) of a recording medium 5, and a medium transporting mechanism 7 for transporting the recording medium 5 in the medium transporting direction. The printer 1 also has a controller controlling the entire operation of the printer 1.

The recording head 2 includes cavities for discharging the ink composition accommodated therein from nozzles, discharge-driving portions provided for the corresponding cavities and applying driving force for discharge to the ink, and nozzles provided for the corresponding cavities and discharging the ink composition to the outside of the head. A plurality of the cavities, the discharge-driving portions for the corresponding cavities, and the nozzles for the corresponding cavities may be provided independently to corresponding heads. The discharge-driving portion can generate the force for discharge the ink with, for example, an electromechanical transducer, such as a piezoelectric element, changing the volume of the cavity by mechanical deformation or an electrothermal transducer generating heat to form bubbles in the ink. The printer 1 may include one head or a plurality of heads for one color ink. In recording using the ink composition of the present invention, a recording head having a stagnation point Y as shown in FIG. 1 may be used. The position of the stagnation point Y is not limited to the position shown in FIG. 1. The stagnation point may be present near a nozzle hole as shown in FIG. 1 or may be present near a driving portion such as a piezoelectric element (for example, within a range of 1 mm from the driving portion).

The ink cartridge 3 is composed of a plurality of independent cartridges, and each cartridge is filled with the ink composition. Although the printer 1 shown is a so-called on-carriage type printer where the ink cartridge 3 is mounted on the carriage 4, the printer 1 is not limited to such a type. For example, the printer 1 may be a so-called off-carriage type printer where an ink container (for example, an ink pack or an ink cartridge) filled with the ink composition is installed on, for example, the housing of the printer 1 to supply the ink to the head 2 through an ink supply tube.

The plastic forming the ink tank contains a stearate releasing agent in some cases. If such an ink tank is used as an ink container, since the area of the ink container in contact with the ink is larger than that of the ink cartridge, a larger amount of the releasing agent is prone to elute into the ink to form water-insoluble stearate with the counter ion in the ink, which may cause nozzle clogging or filter clogging to block discharge.

Since the ink container is exposed to the atmosphere, the air is prone to be dissolved in the ink from the gas-liquid interface. Accordingly, the ink is readily saturated. In addition, since an ink is added to the ink container from another ink container, entrainment of bubbles is prone to occur. These bubbles occlude the printer flow path to inhibit the filling of the head with the ink or reach the inside of the head via the printer flow path to stagnate at the head stagnation point. As a result, the bubbles cannot be removed even if a cleaning sequence is repeated to cause a loss in the piezoelectric pressure, which may cause poor discharge.

EXAMPLES

The present invention will now be more specifically described by examples and comparative examples, but is not limited to the following examples.

Material for Ink Composition

The main materials for the ink compositions used in the following examples and comparative examples are as follows.

Coloring material:
Direct Blue 87
Compounds:
POAAE1
POAAE2
POAAE3
POAAE4
POAAE5
POAAE6
POAAE7
Surfactant:
Olfine E1010 (acetylene glycol surfactant, manufactured by Chemical Industry CO., Ltd.)
BYK 348 (silicone surfactant, manufactured by BYK Japan KK.)
FS-300 (fluorine surfactant, manufactured by E.I. du Pont de Nemours and Company)
Solvent:
Triethylene glycol monobutyl ether
Glycerin pH adjuster:
Triethanolamine
Preparation of POAAE1 to POAAE7

Newcol 1006 manufactured by Nippon Nyukazai Co., Ltd. was left to stand at 70° C. for aging (retaining) to prepare POAAE1 to POAAE7. Specifically, the amount of the compound B having an aldehyde generated in the Newcol 1006 that was being left to stand at 70° C. was measured at appropriate times, and the aging was stopped when the mass ratio of the compound B having an aldehyde group to the compound A having a hydroxy group reached a target value to obtain predetermined POAAE1 to POAAE7. The resulting POAAE1 to POAAE7 contained the compound A having a hydroxy group and the compound B having an aldehyde group.

The content of the compound having an aldehyde group in each of the resulting POAAE1 to POAAE7 was measured by an MBTH method. Assuming that the Newcol 100 before the aging contained 100 mass % of the compound A having a hydroxy group, the content of the compound A after the aging was calculated by subtracting the content of the resulting (converted) compound having an aldehyde group from the content of the compound A before the aging.

In the measurement of the content of the compound B having an aldehyde group by the MBTH method, an excessive amount of MBTH was added to each of the samples (POAAE1 to POAAE7) to change aldehyde contained in the sample to azine, and a ferric chloride solution was then added to the sample to oxidize the MBTH to a reactive cation. The reactive cationic MBTH was allowed to react with the azine. The absorbance of the sample at a wavelength of 635 nm was measured with a spectrophotometer.

Separately, absorbances of standard solutions containing known masses of the compound B were measured under the same conditions as above, and a standard curve of the absorbance at a wavelength of 635 nm and the mass of the compound B was prepared. The content of the compound B in a sample was determined from the absorbance of the sample and the standard curve. The content of the compound A was calculated by subtracting the mass of the compound B after the aging from the mass of the compound A before the aging, and the mass ratio of the compound B to the compound A was calculated. The results are shown below.

TABLE 1

| | Mass ratio ($\times 10^{-4}$) of compound B to compound A in polyoxyalkylene alkyl ether |
|---|---|
| POAAE1 | 3.0 |
| POAAE2 | 0.5 |
| POAAE3 | 7.0 |
| POAAE4 | 1.0 |
| POAAE5 | 20.0 |
| POAAE6 | 0.4 |
| POAAE7 | 35.0 |

Preparation of Ink Composition

The materials for each ink composition shown in Table 2 were mixed and were sufficiently stirred to prepare each ink composition. Specifically, the materials for each ink composition were uniformly mixed, and insoluble matter was removed through a membrane filter having a pore size of 1 μm (1.0 μm JA, manufactured by Merck Millipore Corporation) to prepare each ink. In Table 2, the unit of numerical values is mass %, and the total is 100.0 mass %.

TABLE 2

| | Example 1 | Example 2 | Example 3 | Example 4 | Example 5 | Example 6 | Example 7 | Example 8 | Example 9 |
|---|---|---|---|---|---|---|---|---|---|
| Direct Blue 87 | 5 | 5 | 5 | 5 | 5 | 5 | 5 | 5 | 5 |
| POAAE1 | 1 | | | | | | | | |
| POAAE2 | | 1 | | | | | | | |
| POAAE3 | | | 1 | | | 0.2 | 5 | 1 | 1 |
| POAAE4 | | | | 1 | | | | | |
| POAAE5 | | | | | 1 | | | | |
| POAAE6 | | | | | | | | | |
| POAAE7 | | | | | | | | | |
| Olfine E1010 | 0.5 | 0.5 | 0.5 | 0.5 | 0.5 | 0.5 | 0.5 | | |
| BYK348 | | | | | | | | 0.5 | |
| FS-300 | | | | | | | | | 0.5 |
| Triethylene glycol monobutyl ether | 10 | 10 | 10 | 10 | 10 | 10 | 10 | 10 | 10 |
| Glycerin | 15 | 15 | 15 | 15 | 15 | 15 | 15 | 15 | 15 |
| Triethanolamine | 0.5 | 0.5 | 0.5 | 0.5 | 0.5 | 0.5 | 0.5 | 0.5 | 0.5 |
| Water | Residual quantity | Residual quantity | Residual quantity | Residual quantity | Residual quantity | Residual quantity | Residual quantity | Residual quantity | Residual quantity |
| Total | 100 | 100 | 100 | 100 | 100 | 100 | 100 | 100 | 100 |
| Mass ratio ($\times 10^{-4}$) of compound B to compound A in POAAE | 3.0 | 0.5 | 7.0 | 1.0 | 20.0 | 7.0 | 7.0 | 7.0 | 7.0 |
| Content (ppm) of compound B in ink composition | 3.0 | 4.0 | 7.0 | 1.0 | 20.0 | 1.4 | 35.0 | 7.0 | 7.0 |
| Mist | A | B | A | A | A | A | A | A | A |
| Ink storage stability | A | A | A | A | A | A | A | A | A |
| Foreign matter solubility | A | A | A | A | A | B | A | A | A |
| Initial filling performance | A | A | A | A | A | B | A | A | A |

TABLE 2-continued

|  | Example 10 | Example 11 | Example 12 | Example 13 | Comparative Example 1 | Comparative Example 2 | Comparative Example 3 | Comparative Example 4 |
|---|---|---|---|---|---|---|---|---|
| Direct Blue 87 | 5 | 5 | 5 | 5 | 5 | 5 | 5 | 5 |
| POAAE1 |  |  |  |  |  |  |  |  |
| POAAE2 |  |  |  |  |  |  |  |  |
| POAAE3 | 1 | 3 |  |  |  |  |  |  |
| POAAE4 |  |  | 0.2 |  |  |  |  |  |
| POAAE5 |  |  |  | 6 |  |  |  |  |
| POAAE6 |  |  |  |  | 1 |  |  |  |
| POAAE7 |  |  |  |  |  | 5 |  | 10 |
| Olfine E1010 | 0.3 | 0.5 | 0.5 | 0.5 | 0.5 | 0.5 | 0.5 | 0.5 |
| BYK348 | 0.3 |  |  |  |  |  |  |  |
| FS-300 |  |  |  |  |  |  |  |  |
| Triethylene glycol monobutyl ether | 10 | 10 | 10 | 10 | 10 | 10 | 10 | 10 |
| Glycerin | 15 | 15 | 15 | 15 | 15 | 15 | 15 | 15 |
| Triethanolamine | 0.5 | 0.5 | 0.5 | 0.5 | 0.5 | 0.5 | 0.5 | 0.5 |
| Water | Residual quantity | Residual quantity | Residual quantity | Residual quantity | Residual quantity | Residual quantity | Residual quantity | Residual quantity |
| Total | 100 | 100 | 100 | 100 | 100 | 100 | 100 | 100 |
| Mass ratio ($\times 10^{-4}$) of compound B to compound A in POAAE | 7.0 | 7.0 | 1.0 | 20.0 | 0.4 | 35.0 | — | 35.0 |
| Content (ppm) of compound B in ink composition | 7.0 | 21.0 | 0.2 | 120.0 | 0.5 | 125.0 | — | 250.0 |
| Mist | A | A | A | B | C | C | C | C |
| Ink storage stability | A | A | A | B | A | A | A | C |
| Foreign matter solubility | A | A | B | A | A | A | C | A |
| Initial filling performance | A | A | B | A | A | A | C | A |

Foreign Matter Solubility

The ink composition was put in an ink cartridge, and the cartridge was sealed and was stored at 60° C. for 1 week. The ink composition (2 mL) in the ink cartridge after the storage was filtered through a filter having a pore diameter of 10 μm (Filter φ 10 μm, manufactured by Merck Millipore Corporation). The number of the particles collected on the filter was counted using an optical microscope (VHX-5000, manufactured by Keyence Corporation).

Evaluation Criteria:

A: the number of particles having a size of 10 μm or more is less than 10;

B: the number of particles having a size of 10 μm or more is 10 or more and less than 20; and C: the number of particles having a size of 10 μm or more is 20 or more.

Initial Filling Performance

The ink cartridge of a recording apparatus (Ink jet printer EP-805A, manufactured by Seiko Epson Corporation) was filled with the ink composition. The head mounted on the printer used had a stagnation point such as that shown in FIG. 1. The initial filling operation of the head was carried out in accordance with the initial filling sequence prescribed for the recording apparatus. Subsequently, the nozzles were checked for the discharge of the ink composition through the nozzles. If any of the nozzles could not discharge the ink composition, the head was cleaned (suction of the ink in the nozzles). The nozzles were then checked again. The initial filling performance was evaluated based on the number of times of cleaning required until all the nozzles could discharge the ink by the following criteria.

Evaluation Criteria:

A: all nozzles discharged the ink after the initial filling sequence only;

B: all nozzles discharged the ink after cleaning once; and

C: all nozzles discharged the ink after cleaning twice or more.

Mist

Continuous printing was performed by discharging the ink composition to recording media with a recording apparatus (Ink jet printer EP-805A, manufactured by Seiko Epson Corporation) for 10 minutes. In the continuous printing, in order to observe ink mist scattered inside the recording apparatus, a patch of photographic paper "Gloss" (manufactured by Seiko Epson Corporation) cut into a square of 3×3 cm was attached near the carriage encoder at the center of the carriage scanning range. After completion of the printing operation, the patch was detached, and the OD value of the patch was measured with Eye-One manufactured by GretagMacbeth. Scattering of mist was evaluated based on the measurement results by the following evaluation criteria.

Evaluation Criteria:

A: OD value≤0.05,

B: 0.05<OD value≤0.1, and

C: 0.1<OD value.

Ink Storage Stability

The ink composition was put in a glass bottle, and the bottle was sealed and stored at 60° C. for 1 week. The viscosity of the ink composition at 20° C. was measured before and after the storage at 20° C. and a shear rate of 200 s$^{-1}$ with a viscoelasticity measuring apparatus Physica MCR301 manufactured by Anton Paar, and the rate of change in viscosity between before and after the storage was calculated. The increase percentage in the viscosity of the ink composition after the storage relative to the viscosity before the storage, i.e., the percentage of thickening, was calculated. In addition, whether phase separation occurred in the ink composition or not was visually observed. The ink storage stability was evaluated based on the results by the following evaluation criteria.

Evaluation Criteria:

A: the thickening was less than 5%, and no phase separation occurred in the ink composition, B: the thickening was 5% or more and less than 10%, and phase separation occurred in the ink composition, and C: the thickening was 10% or more and less than 15%, and phase separation occurred in the ink composition.

This application claims priority to Japanese Patent Application No. 2016-118214 filed on Jun. 14, 2016. The entire disclosure of Japanese Patent Application No. 2016-118214 is hereby incorporated herein by reference.

What is claimed is:

1. An ink composition at least comprising:
a compound A and a compound B as polyoxyalkylene alkyl ether surfactants, wherein
the compound A has a hydroxy group and is represented by Formula (1), and the compound B has an aldehyde group and is represented by Formula (2):

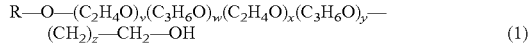
(1)

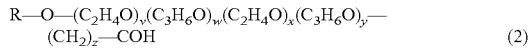
(2)

in Formulae (1) and (2), each R independently represents an alkyl group having 1 to 20 carbon atoms, each v independently represents 1 to 20, each w independently represents 0 to 20, each x independently represents 0 to 20, each y independently represents 0 to 20, and each z independently represents 1 to 2; and a relationship of $5 \leq v+w+x+y+z \leq 30$ is satisfied; and
the mass ratio of the compound B to the compound A is $0.5 \times 10^{-4}$ to $30 \times 10^{-4}$.

2. The ink composition according to claim 1, wherein
the content of the compound B is 1 to 100 ppm based on the total amount of the ink composition.

3. The ink composition according to claim 1, wherein
the content of the polyoxyalkylene alkyl ether surfactants is 0.2 to 5.0 mass % based on the total amount of the ink composition.

4. The ink composition according to claim 1, further comprising water, a penetration solvent, a coloring material, and at least one selected from the group consisting of acetylene glycol surfactants, polysiloxane surfactants, and fluorine surfactants.

5. A recording method comprising:
discharging the ink composition according to claim 1 with an ink jet system; and
allowing the ink composition to adhere to a recording medium.

* * * * *